(12) United States Patent
Ohseki et al.

(10) Patent No.: US 12,193,065 B2
(45) Date of Patent: Jan. 7, 2025

(54) TERMINAL DEVICE EXECUTING RANDOM ACCESS PROCEDURE, BASE STATION DEVICE, CONTROL METHOD, AND COMPUTER-READABLE STORAGE MEDIUM

(71) Applicant: KDDI CORPORATION, Tokyo (JP)

(72) Inventors: Takeo Ohseki, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 349 days.

(21) Appl. No.: 17/687,303

(22) Filed: Mar. 4, 2022

(65) Prior Publication Data

US 2022/0191942 A1 Jun. 16, 2022

Related U.S. Application Data

(63) Continuation of application No. PCT/JP2020/036259, filed on Sep. 25, 2020.

(30) Foreign Application Priority Data

Sep. 27, 2019 (JP) ................... 2019-176948

(51) Int. Cl.
*H04W 74/08* (2024.01)
*H04W 74/0833* (2024.01)
*H04W 76/27* (2018.01)

(52) U.S. Cl.
CPC ....... *H04W 74/0833* (2013.01); *H04W 76/27* (2018.02)

(58) Field of Classification Search
CPC .......... H04W 52/0274; H04W 74/002; H04W 74/0833; H04W 76/19; H04W 76/27; H04W 76/30; H04W 76/40
See application file for complete search history.

(56) References Cited

U.S. PATENT DOCUMENTS

| 2018/0234839 A1* | 8/2018 | Tenny | ............... H04W 36/0033 |
| 2019/0289661 A1* | 9/2019 | Chen | ..................... H04W 24/10 |

(Continued)

FOREIGN PATENT DOCUMENTS

| EP | 3506708 A | 7/2019 | |
| WO | WO-2009136830 A1 * | 11/2009 | ........ H04W 52/0251 |
| WO | WO-2018204863 A1 * | 11/2018 | ........... H04B 17/309 |

OTHER PUBLICATIONS

Office Action issued in corresponding Japanese Patent Application No. 2019-176948 dated Jun. 23, 2023 (10 pages).

(Continued)

*Primary Examiner* — Phuc H Tran
(74) *Attorney, Agent, or Firm* — Foley & Lardner LLP

(57) ABSTRACT

The present invention provides a terminal device comprising: transmission unit configured to transmit a first message including user data to a base station device in a random access procedure in a mobile communication network; and control unit configured to control the transmission unit to: in a case where a predetermined condition to transition from an inactive state to a connected state is satisfied, transmit the first message that includes predetermined information for notifying the base station device that the terminal device needs to transition to the connected state; and in a case where the predetermined condition is not satisfied, transmit the first message that does not include the predetermined information.

14 Claims, 15 Drawing Sheets

(56) References Cited

U.S. PATENT DOCUMENTS

2020/0107369 A1* 4/2020 Jeon .................... H04W 74/006
2021/0329712 A1* 10/2021 Pham Van .......... H04W 12/106

OTHER PUBLICATIONS

Samsung, "Overall procedure for data transfer in inactive state", 3GPP TSG-RAN WG2 Meeting #6, R2-168051, Nov. 14, 2016-Nov. 18, 2016, Reno, USA (8 pages).
ZTE Corporation, Sanechips, "Msg1 payload contents for 2-step RACH", [online], 3GPP TSG-RAN WG2 #103bis R2-1814032, Oct. 2018, pp. 1-10.
Qualcomm Incorporated, "New WID on small data for NR", [online], 3GPP TSG RAN #84 RP-190838, Jun. 2019, pp. 1-6.
ERICSSON (Rapporteur)—Report of email discussion: [96#31][NR] UL data in inactive solution B; 3GPP TSG-RAN WG2 NR Adhoc Meeting Spokane, USA, Jan. 17-19, 2017; R2-1700626; server date Jan. 18, 2017; downloaded by EPO on Jan. 18, 2017 (28 pages).
Extended European Search Report issued in corresponding European Patent Application No. 20869997.5 (6 pages).

* cited by examiner

Prior Art

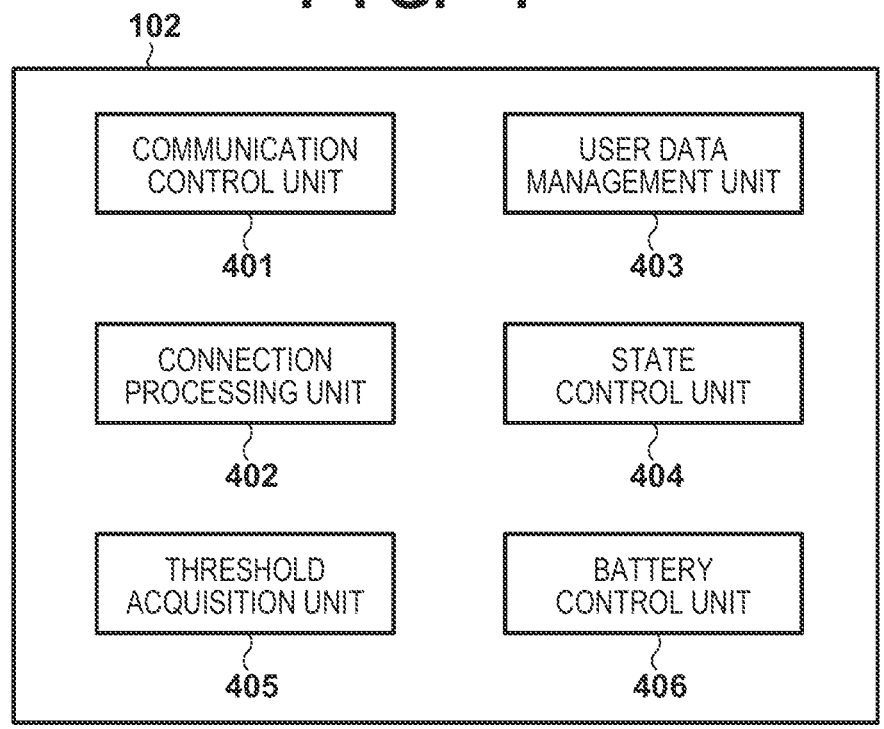
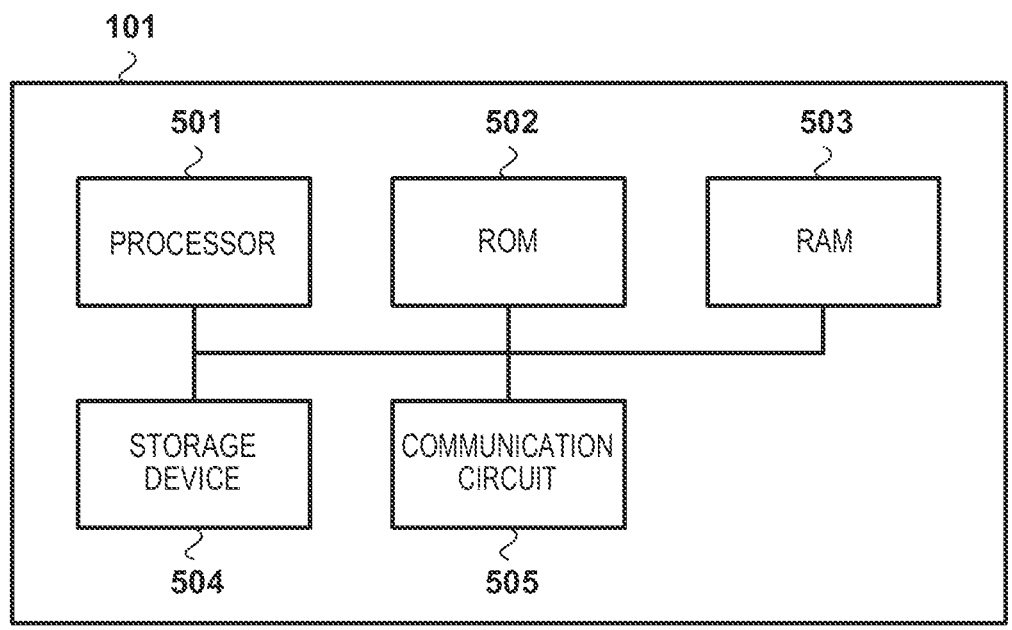

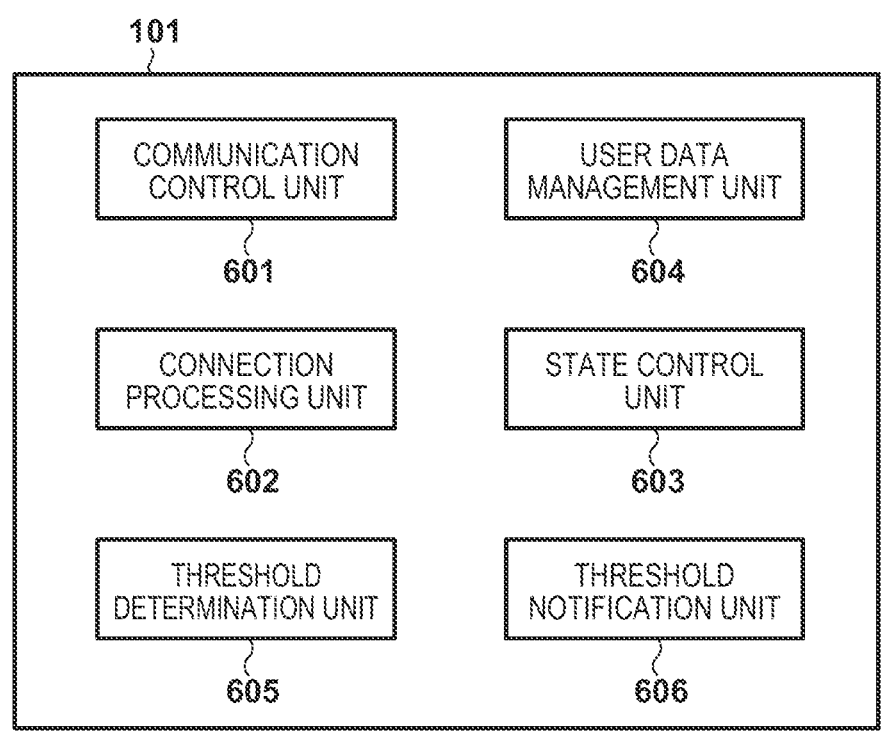

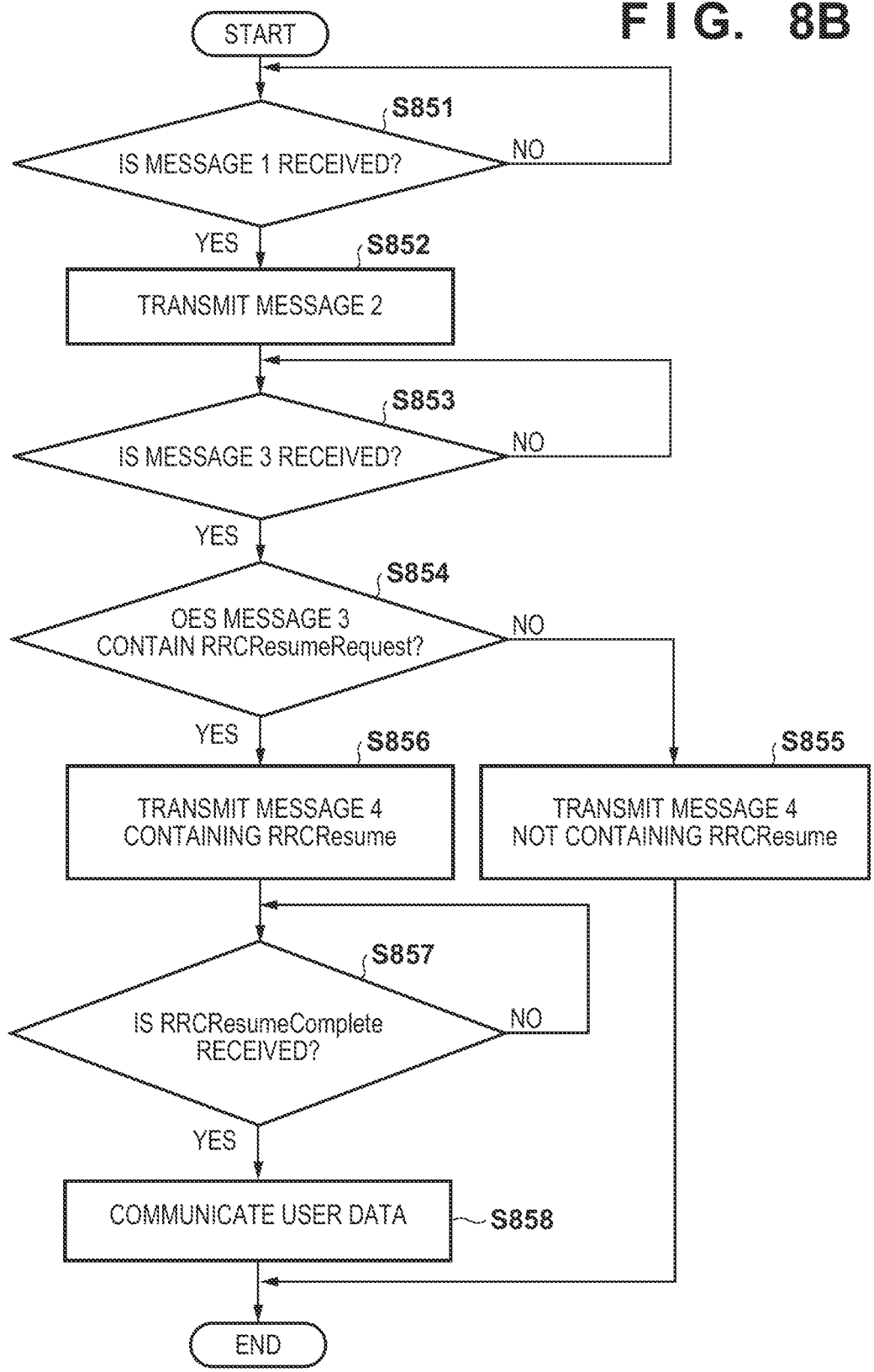

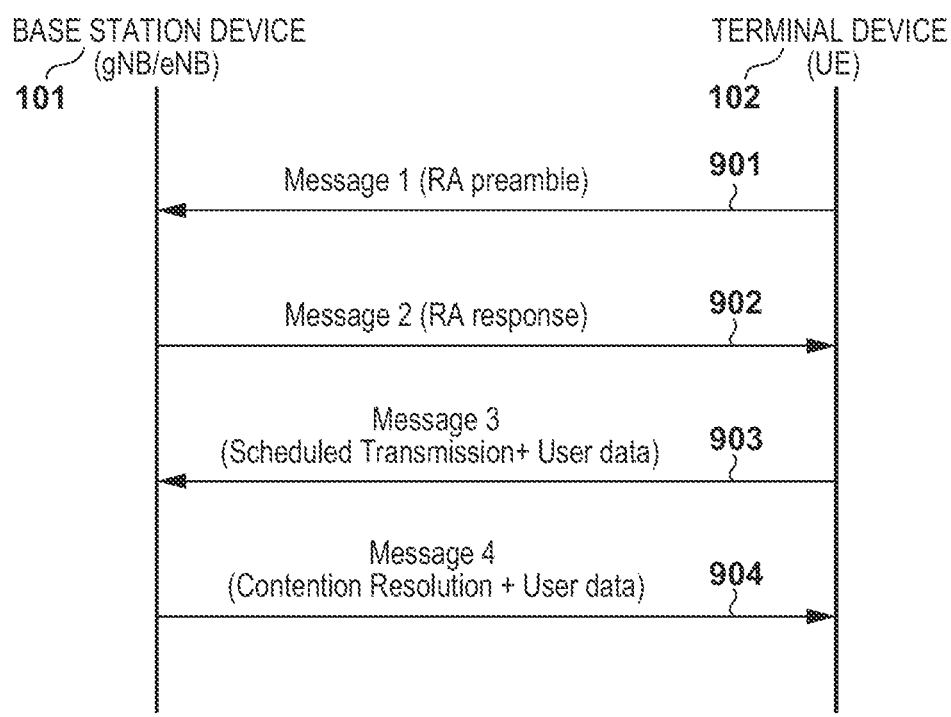
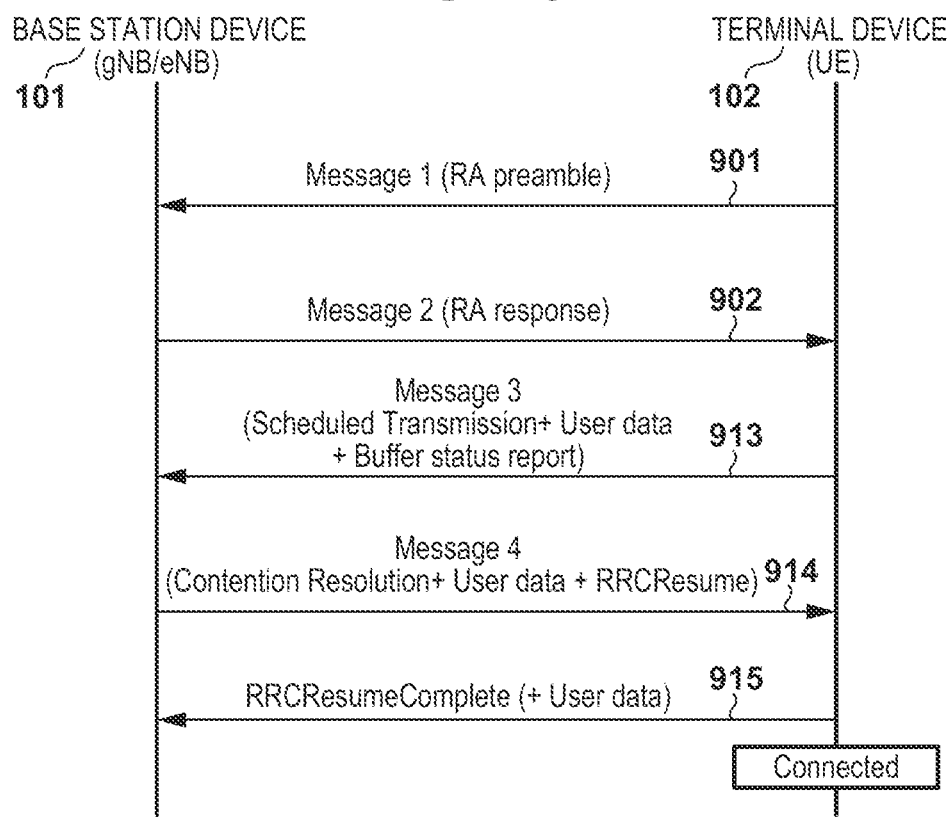

TERMINAL DEVICE EXECUTING RANDOM ACCESS PROCEDURE, BASE STATION DEVICE, CONTROL METHOD, AND COMPUTER-READABLE STORAGE MEDIUM

CROSS-REFERENCE TO RELATED APPLICATION(S)

This application is a continuation of International Patent Application No. PCT/JP2020/036259 filed on Sep. 25, 2020, which claims priority to and the benefit of Japanese Patent Application No. 2019-176948 filed on Sep. 27, 2019, the entire disclosures of which are incorporated herein by reference.

BACKGROUND OF THE INVENTION

Field of the Invention

The present invention relates to a terminal device that executes a random access procedure, a base station device, a control method, and a computer-readable storage medium, and specifically to a technique for improving the random access procedure.

Description of the Related Art

In the 3rd Generation Partnership Project (3GPP), standards for wireless communication systems, such as long term evolution (LTE) and fifth-generation (5G) New Radio (NR) have been established. LTE and NR prescribe random access procedures for initial connection between a terminal device and a base station device. For the random access procedures, four-step and two-step messaging processing procedures have been proposed. Note that, hereinafter, the two-step random access procedure may be referred to as "two-step RACH," and the four-step random access procedure may be referred to as "four-step RACH."

FIG. 1A illustrates an example of four-step RACH processing. In four-step RACH, first, a terminal device (user equipment (UE)) transmits a random access (RA) preamble as a first message (message 1) to a base station device. In one example, the base station device is denoted as gNB in the case of NR and denoted as eNB in the case of LTE. Note that the RA preamble is sent using a predetermined radio resource (frequency-time resource). When the base station device detects the RA preamble, the base station device transmits an RA response as a second message (message 2) to the terminal device. The message 2 contains information on radio resources to be used for the transmission of a third message (message 3) to be sent by the terminal device after the message 2 is received and parameters to be used for signal transmission. The message 2 contains various kinds of information such as timing advance (TA) for synchronizing the timing of signals. The terminal device uses the radio resource designated by the information and the various kinds of information to transmit predetermined information for establishing initial access to the base station device as a message 3. For example, when the terminal device is in an inactive (RRC_Inactive) state, the message 3 contains RRCResumeRequest requesting an instruction to transition to a connected (RRC_Connected) state. In the case where the base station device gives an instruction to transition to the connected state as a response, a fourth message (message 4) contains RRCResume instructing the transition to the connected state. The base station device then transmits the message 4 to the terminal device in response to the message 3. Through such a procedure, initial connection is established between the terminal device and the base station device.

FIG. 1B illustrates an example of the two-step random access procedure processing. In the two-step RACH, first, the UE transmits the above-described RA preamble and the predetermined information for establishing initial access as a first message (message A). Subsequently, when the base station device detects the RA preamble, the base station device transmits a response to the RA response and the predetermined information for establishing the initial access, as a second message (message B). For example, when the terminal device is in an inactive state, the message A contains RRCResumeRequest requesting an instruction to transition to the connected state. In the case where the base station device responds with an instruction to transition to the connected state, the message B contains RRCResume instructing the transition to the connected state.

For 3GPP, it is under consideration to transmit and receive small amounts of user data between a base station device and a terminal device in an inactive state without transition to a connected state. 3GPP, RP-190838 describes a two-step RACH and a four-step RACH in which user data is transmitted and received between a terminal device and a base station device while the terminal device is kept in an inactive state. The base station device, however, is unable to determine whether or not the user data should be transmitted and received while the terminal device is kept in the inactive state or after the terminal device transitions to the connected state. As a result of the RACH processing with the terminal device, the base station device may, for example, cause the terminal device to unnecessarily transition to the connected state and thereby cause an increase in the number of unnecessary signaling messages.

SUMMARY OF THE INVENTION

The present invention provides a technique for appropriately managing the state of a terminal device when user data is transmitted and received between the terminal device and a base station device through a random access procedure.

A terminal device according to one aspect of the present invention includes: transmission means for transmitting a first message including user data to a base station device in a random access procedure in a mobile communication network; and control means for controlling the transmission means to: in a case where a predetermined condition to transition from an inactive state to a connected state is satisfied, transmit the first message that includes predetermined information for notifying the base station device that the terminal device needs to transition to the connected state; and in a case where the predetermined condition is not satisfied, transmit the first message that does not include the predetermined information.

According to the present invention, the state of a terminal device can be appropriately managed when user data is transmitted and received between the terminal device and a base station device through a random access procedure.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a diagram illustrating a functional configuration example of a terminal device.

FIG. 5 is a diagram illustrating a hardware configuration example of a base station device.

FIG. 6 is a diagram illustrating a functional configuration example of a base station device.

FIG. 8B is a diagram illustrating an example flow of processing executed in the wireless communication system according to the first embodiment.

FIG. 9A is a diagram illustrating an example of messages transmitted and received in a wireless communication system according to a second embodiment.

FIG. 9B is a diagram illustrating an example of messages transmitted and received in a wireless communication system according to the second embodiment.

DESCRIPTION OF THE EMBODIMENTS

Figure 1A:
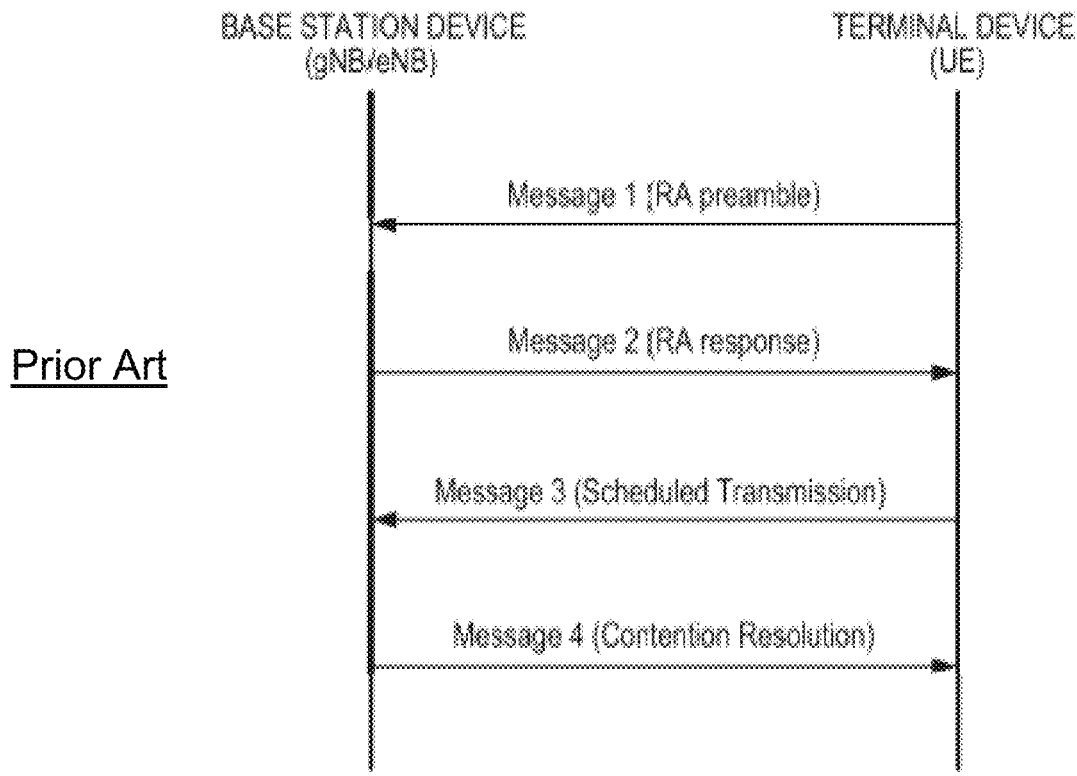
FIG. 1A is a diagram schematically illustrating the flow of a known four-step random access procedure.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

Figure 2:
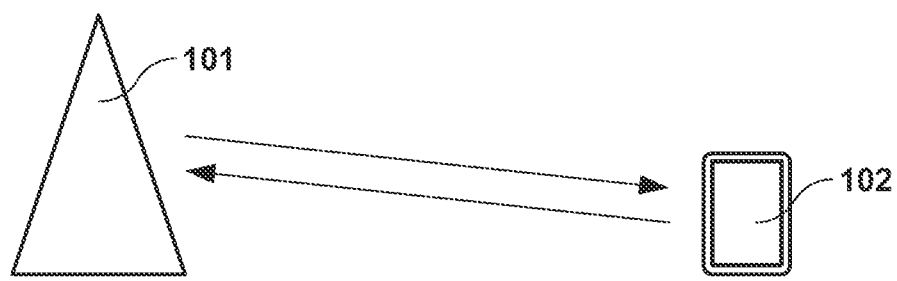
FIG. 2 is a diagram illustrating a configuration example of a wireless communication system.

FIG. 2 illustrates a configuration example of a wireless communication system according to the present embodiment. In one example, the system is a 5G cellular communication system (mobile communication network). However, the system is not limited to this, and may be, for example, a cellular communication system subsequent to 5G, or a wireless communication system other than cellular. The system includes a base station device 101 and a terminal device 102. Note that FIG. 2 illustrates only one base station device and one terminal device for ease of explanation. However, the number of these devices is not limited, and obviously, there may be more base station devices and terminal devices.

Figure 1B:
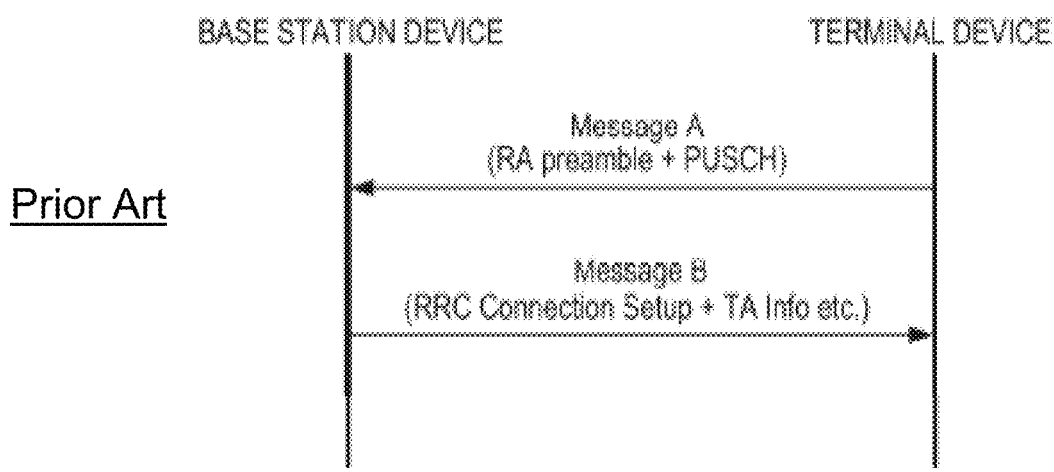
FIG. 1B is a diagram schematically illustrating the flow of a known two-step random access procedure.

The terminal device 102 according to the present embodiment establishes connection with the base station device 101 by executing a four-step RACH or a two-step RACH, as illustrated in FIG. 1A or 1B. Note that the two-step RACH can establish connection between the terminal device and the base station device in a shorter time than in the four-step RACH because the connection can be established merely by the terminal device and the base station device each sending one message.

In the present embodiment, the base station device and the terminal device transmit and receive a small amount of user data during the RACH processing. At this time, for example, if the transmission and reception of the user data are completed during the RACH phase or is completed by transmission and reception in a small number of times, the terminal device does not have to be resumed (Resume) from the inactive state to the connected state. In contrast, for example, when a large amount of user data is transmitted and received, the terminal device should be resumed from the inactive state to the connected state.

However, the base station device does not have a mechanism for determining whether or not the terminal device needs to transition from the inactive state to the connected state. Thus, the base station device may not provide the terminal device with a Resume instruction when the terminal device needs to be resumed to the connected state, or may provide a Resume instruction when the terminal device does not need to be resumed to the connected state. As a result, the frequency utilization efficiency may decrease due to the transmission and reception of unnecessary signaling messages and repeated execution of unnecessary RACH processing.

Therefore, in the wireless communication system according to the present embodiment, the terminal device determines whether to transmit and receive user data in the inactive state or to transition to the connected state to transmit and receive the user data in the RACH phase, and notifies the base station device of the decision. On the basis of this notification, the base station device determines whether the terminal device is to be transitioned to the connected state or to be maintained in the inactive state, and sends a signaling message corresponding to the determined content to the terminal device. In this way, the base station device can appropriately determine whether or not the terminal device in the inactive state should be transitioned to the connected state, and a reduction in the frequency utilization efficiency can be prevented.

The configuration of the devices executing such processing and some embodiments of the processing flow will now be described. The following embodiments explain the processing for sending messages including predetermined information indicating whether or not the terminal device satisfies a predetermined condition to transition to the connected state when the terminal device in the inactive state sends user data to the base station device.

First Embodiment

Configuration of Terminal Device

Figure 3:
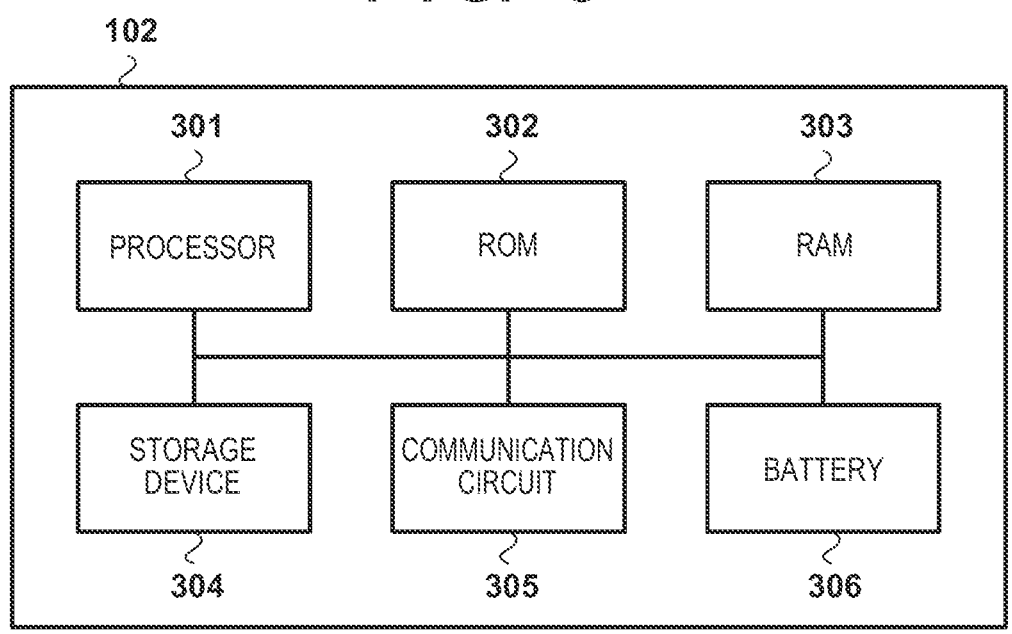
FIG. 3 is a diagram illustrating a hardware configuration example of a terminal device.

FIG. 3 illustrates a hardware configuration example of the terminal device 102 according to the present embodiment. In one example, the terminal device 102 includes a processor 301, a ROM 302, a RAM 303, a storage device 304, a communication circuit 305, and a battery 306. In the terminal device 102, for example, the processor 301 executes programs for implementing the respective functions of the terminal device 102 in the four-step RACH or the two-step RACH recorded in any of the ROM 302, the RAM 303, and the storage device 304. Note that the processor 301 may be one or more processors, such as a central processing unit (CPU), an application specific integrated circuit (ASIC), a field programmable gate array (FPGA), and a digital signal processor (DSP).

The terminal device 102, for example, controls the communication circuit 305 by the processor 301 to communicate with a responding device (for example, the base station device). Note that, FIG. 3 schematically illustrates a terminal device including one communication circuit 305, but the present invention is not limited to this. For example, the terminal device 102 may include a communication circuit for communication with the base station device 101 and a communication circuit for communication, such as a wireless LAN. The terminal device 102 includes a battery 306, such as a secondary battery capable of charging and discharging. The battery 306 supplies power to the components of the terminal device 102 illustrated in FIG. 3.

Note that the terminal device 102 may include dedicated hardware for executing each function, or may execute some of the functions by hardware and the other functions by a computer that runs programs. Alternatively, all functions may be executed by a computer and programs.

A functional configuration example of the terminal device 102 according the present embodiment will now be described with reference to FIG. 4. The terminal device 102 includes, as its functions, a communication control unit 401, a connection processing unit 402, a user data management unit 403, a state control unit 404, a threshold acquisition unit 405, and a battery control unit 406. Note that the terminal device may obviously have a further function as a general terminal device, but a description of this is omitted here for simplicity.

The communication control unit 401 controls communication (for example, wireless communication conforming to the 5G communication standard) executed between the terminal device 102 and the base station device 101. The communication control unit 401 executes various controls for, for example, executing communication with the base station device 101. In one example, the communication control unit 401 executes various controls for wireless communication conforming to the 5G standard. The connection processing unit 402 executes the two-step RACH or the four-step RACH via the communication control unit 401 to establish connection with the base station device 101.

The user data management unit 403 temporarily holds user data to be transmitted to and received from the base station device 101. The state control unit 404 manages the connection state with the base station device 101 including an idle (RRC_Idle) state, an inactive state, and a connected state. The idle state is a kind of standby state in which no connection is established between the base station device 101 and the terminal device 102, and the context information of the terminal device 102 is not held in the base station device 101. The inactive state is also a kind of standby state in which no connection is established between the base station device 101 (or a network node capable of communicating with the base station device 101) and the terminal device 102, but the base station device 101 and the network node hold the context information of the terminal device 102. In one example, the terminal device 102 in the inactive state supplies power to the control unit but does not supply power to the wireless communication unit. In this way, the power consumption of the terminal device 102 can be suppressed. The connected state is a state in which resources are allocated for the terminal device 102 by the base station device 101, and unicast communication is available.

The threshold acquisition unit 405 acquires a threshold value used for determining whether or not the state managed by the state control unit 404 should be transitioned to the connected state. In one example, the threshold acquisition unit 405 may acquire threshold information from a broadcast signal sent from the base station device 101. The threshold acquisition unit 405 may acquire threshold information from individual messages sent when the connection with the base station device 101 is disconnected and the state managed by the state control unit 404 transitions to the inactive state. The battery control unit 406 controls the operation, including charging and discharging, of the battery 306 of the terminal device 102. The battery control unit 406 can acquire the battery level of the battery 306.

The state control unit 404 controls the state of the terminal device 102 on the basis of information from at least one of the connection processing unit 402, the user data management unit 403, the threshold acquisition unit 405, and the battery control unit 406.

For example, when the user data management unit 403 stores user data and the state control unit 404 is managing the inactive state or the idle state, the connection processing unit 402 executes the four-step RACH or the two-step RACH. When the state control unit 404 is managing an idle state, the state transitions to the connected state, and the communication control unit 401 performs communication of the user data after the state transition. If the state control unit is managing the inactive state, pieces of the user data smaller than a predetermined size among the pieces of user data stored in the user data management unit 403 can be contained in a message and sent. When the terminal device 102 is in the connected state, the communication control unit 401 transmits and receives the user data stored in the user data management unit 403 with the resource allocated by the base station device 101.

The state control unit 404 determines whether to attempt the transition from the inactive state or the idle state to the connected state in accordance with the amount of user data held by the user data management unit 403. If the state control unit 404 determines that the transition to the connected state should be made, the state control unit 404 executes the four-step RACH or the two-step RACH. For example, in the inactive state, if the amount of user data is small enough that the transmission of user data is completed by the message 3 or the message A in the RACH phase, the state control unit 404 can determine not to transition to the connected state.

In one example, the terminal device 102 can determine that the condition to transition to the connected state is satisfied when the terminal device 102 determines that the user data held by the user data management unit 403 is of an amount that cannot be sent by a predetermined number of messages 3. For example, when the user data to be sent is of a small amount, the terminal device 102 determines to send the user data by one or more messages 3, instead of sending the user data after transitioning to the connected state.

In another example, the terminal device 102 may predict a traffic pattern on the basis of the history of user data sent to the base station device 101. For example, if the terminal device 102 periodically executes a program requiring the transmission and reception of user data, the user data management unit 403 may specify a traffic generation pattern and determine that the condition to transition to the connected state is satisfied when the generation cycle or the time until the next generation timing is shorter than a predetermined time interval. In another example, the amount of user data to be sent may be predicted on the basis of the history of the amount of user data held by the user data management unit 403, and the transition to the connected state can be determined when it is determined that the predicted amount of user data cannot be sent only by the message 3.

In one example, the state control unit 404 may determine whether or not to attempt the transition from the inactive state to the connected state on the basis of the battery level of the terminal device 102 acquired by the battery control unit 406. For example, when the battery level is low, transition to the connected state may not be attempted even when the amount of data held by the user data management unit 403 is large, relative to when the battery level is high. Thus, when the battery level is low, the probability of maintaining the inactive state increases, and battery consumption can be suppressed.

Configuration of Base Station Device

FIG. 5 illustrates a hardware configuration example of the base station device 101 according to the present embodiment. In one example, the base station device 101 includes a processor 501, a ROM 502, a RAM 503, a storage device 504, and a communication circuit 505. These components are respectively the same as the processor 301, the ROM 302, the RAM 303, the storage device 304, and the communication circuit 305 of the terminal device 102, and thus descriptions of these are omitted. Note that the base station device 101 may include, for example, a communication circuit for communication with the terminal device 102 and a communication circuit for communication with a network node.

FIG. 6 illustrates a functional configuration example of the base station device 101 according to the present embodiment. The base station device 101 includes, as its functions, a communication control unit 601, a connection processing unit 602, a state control unit 603, a user data management unit 604, a threshold determination unit 605, and a threshold notification unit 606. Note that the base station device 101 may obviously have a further function as a general base station device, but a description of this is omitted here for simplicity.

The communication control unit 601 controls communication (for example, wireless communication conforming to the 5G communication standard) executed between the terminal device 102 and the base station device 101. The communication control unit 601 executes various controls for executing, for example, communication with the terminal device 102. In one example, the communication control unit 601 executes various controls for wireless communication conforming to the 5G standard. The connection processing unit 602 establishes connection with the terminal device 102 by performing message processing for the two-step RACH or the four-step RACH started by the terminal device 102 via the communication control unit 601.

The state control unit 603 determines whether or not to instruct the transition to the connected state on the basis of the message 3 of the four-step RACH or the message A of the two-step RACH from the terminal device 102 in the inactive state, as described below.

The user data management unit 604 temporarily stores the user data received from the terminal device 102 and the user data to be sent to the terminal device 102.

The threshold determination unit 605 determines a threshold value to be used for determining whether or not to instruct the terminal device 102 to transition to the connected state. The threshold notification unit 606 generates signals (for example, broadcast signals (RACH Config) and signals containing messages for the terminal device 102 to transition to the inactive state (RRCRelease with suspendConfig)) for notifying the terminal device 102 of the threshold value determined by the threshold determination unit 605. The signals generated by the threshold notification unit 606 are provided to the terminal device 102 by the communication control unit 601.

Processing Flow

Figure 7A:
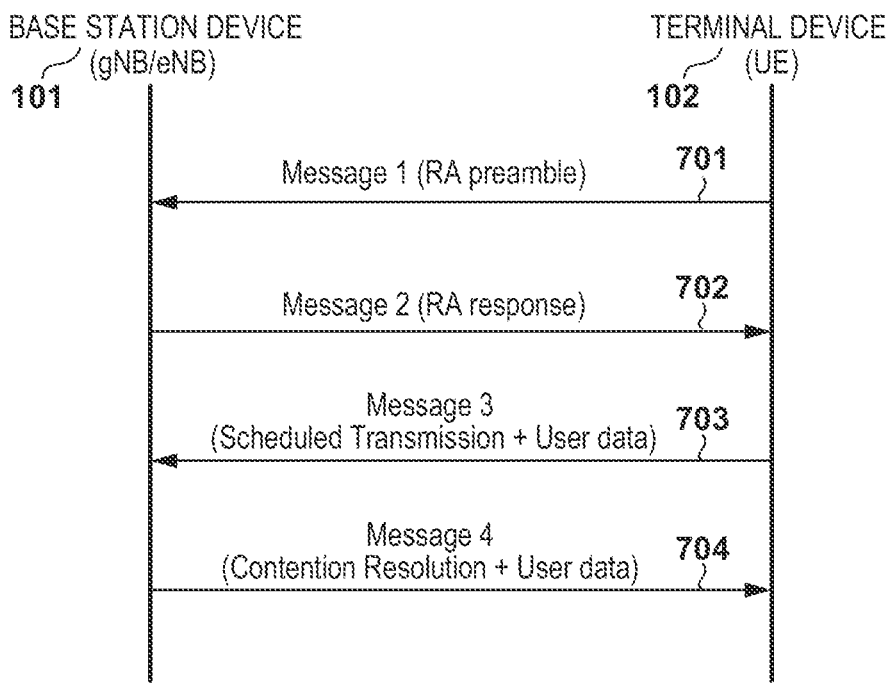
FIG. 7A is a diagram illustrating an example of messages transmitted and received in a wireless communication system according to a first embodiment.
Figure 7B:
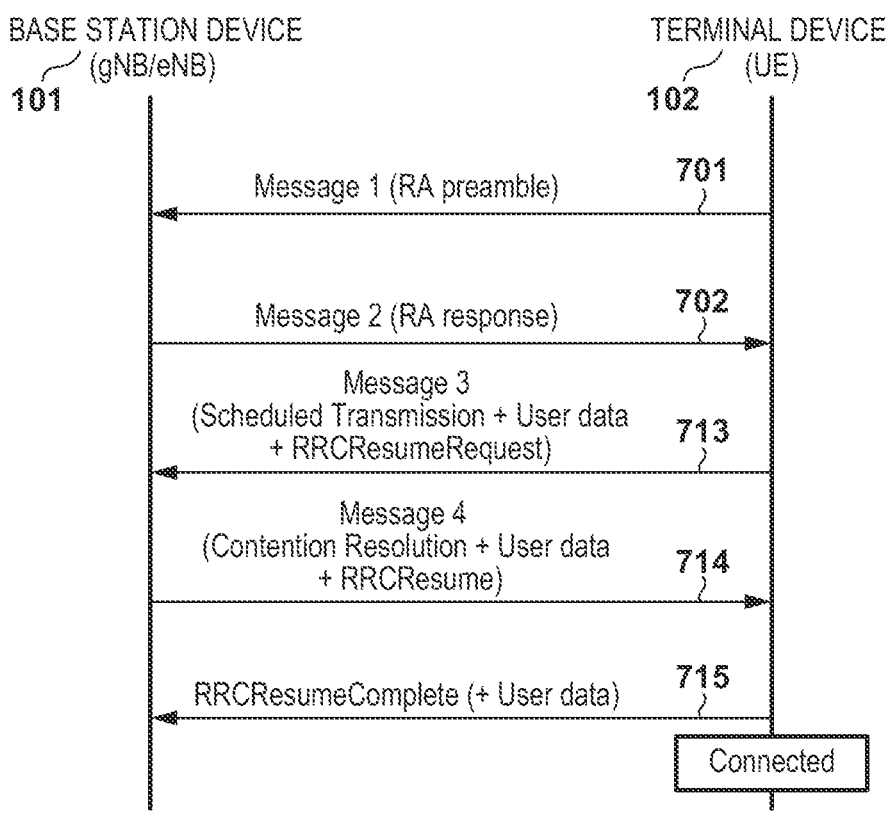
FIG. 7B is a diagram illustrating an example of messages transmitted and received in a wireless communication system according to the first embodiment.
Figure 8A:
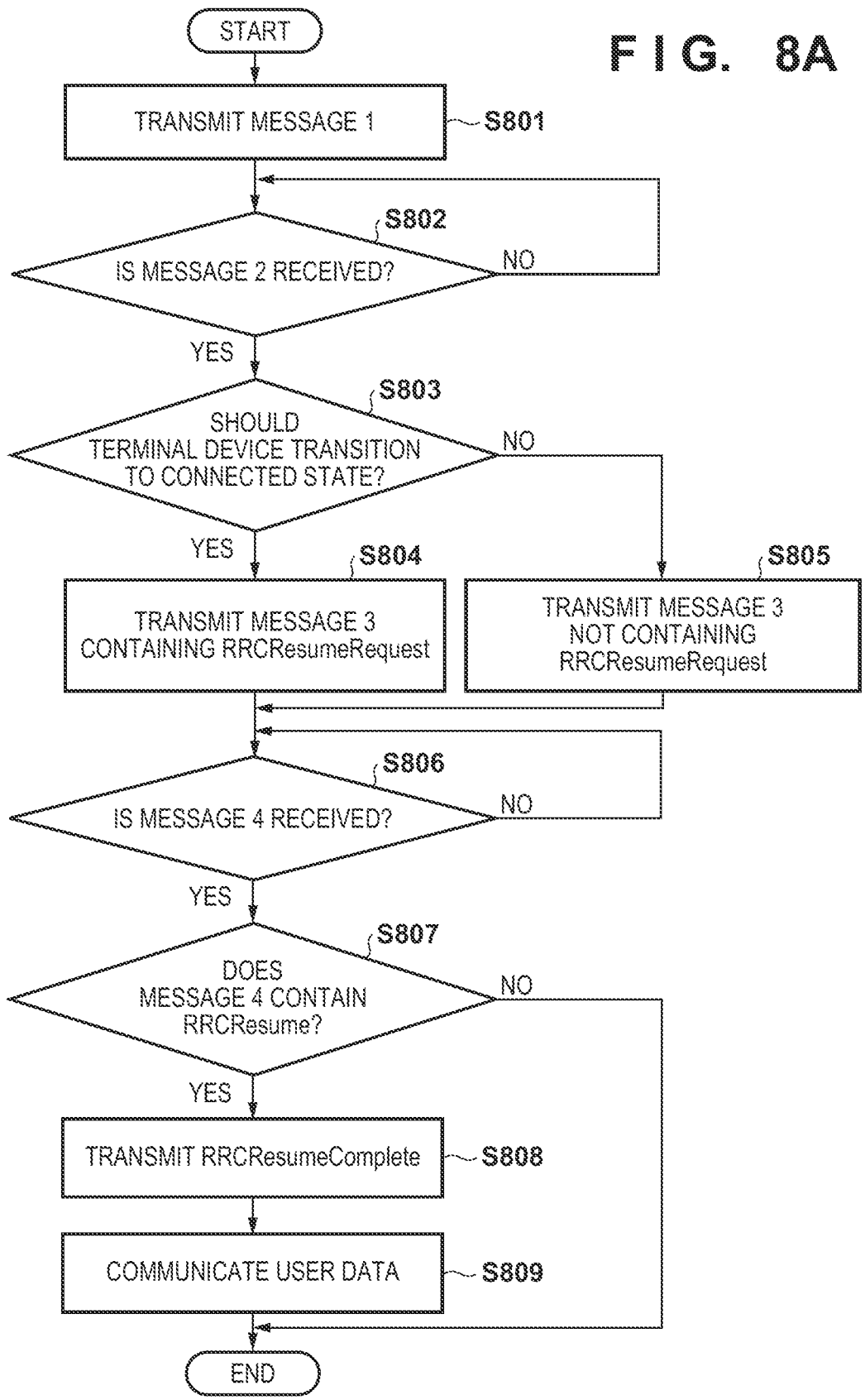
FIG. 8A is a diagram illustrating an example flow of processing executed in the wireless communication system according to the first embodiment.

An example flow of the processing according to the present embodiment will now be described with reference to FIGS. 7A, 7B, 8A, and 8B. FIG. 7A illustrates example messages in the four-step RACH in a case where user data is transmitted and received between the base station device 101 and the terminal device 102 in the inactive state, and the base station device 101 is notified of the terminal device 102 not satisfying the condition to transition to the connected state. FIG. 7B illustrates example messages in the four-step RACH in the case where user data is transmitted and received between the base station device 101 and the terminal device in the inactive state, and the base station device 101 is notified of the terminal device 102 satisfying the condition to transition to the connected state. FIGS. 8A and 8B illustrate an example of processing executed by the terminal device 102 and the base station device 101 for the message processing illustrated in FIGS. 7A and 7B.

In FIGS. 7A and 7B, first, the terminal device 102 sends a message 1 (message 701) to the base station device 101. The message 701 is the same as a conventional four-step RACH random access preamble. The base station device 101 then sends a message 2 (message 702) in response to the message 701. The message 702 is the same as a conventional four-step RACH random access response.

The terminal device 102 that has received the message 702 from the base station device 101 sends a message 3 (message 703, 713) containing user data to the base station device 101. Here, when the terminal device 102 satisfies the condition to transition to the connected state, the terminal device 102 sends a message 713 containing user data and RRCResumeRequest. When the terminal device 102 does not satisfy the condition to transition to the connected state, the terminal device 102 sends a message 703 containing user data but not containing RRCResumeRequest. RRCResumeRequest is a message for requesting the transition to the connected state, and, here, it is a message for requesting the base station device 101 to send a message 4 containing RRCResume for instructing the terminal device 102 to transition to the connected state. Thus, the base station device 101 that has received the message 3 can determine whether or not the terminal device 102 should transition to the connected state by determining whether or not the message 3 contains RRCResumeRequest. Note that at least one of the user data and RRCResumeRequest is sent via a physical uplink shared channel (PUSCH).

When the received message 3 is the message 703 not containing RRCResumeRequest, the base station device 101 sends a message 4 (message 704) not containing RRCResume instructing the transition to the connected state, to the terminal device 102. The terminal device 102 that has received the message 704 maintains the inactive state. When the received message 3 is the message 713 containing RRCResumeRequest, the base station device 101 sends a message 4 (message 714) containing Contention Resolution and RRCResume instructing the transition to the connected state, to the terminal device 102. The terminal device 102 that has received the message 714 sends RRCResumeComplete (message 715) of the transition from the inactive state to the connected state, to the base station device 101, and then sends and receives the remaining user data. Note that the terminal device 102 may contain user data in the message 715.

An example of processing executed by the terminal device 102 according to the present embodiment in the four-step RACH will now be described with reference to FIG. 8A. The processing of FIG. 8A is started by the processor 301 executing a predetermined program when it is determined that there is data to be sent in the user data management unit 403 of the terminal device 102.

In step S801, the terminal device 102 sends a message 1 of the four-step RACH to the base station device 101. The processing then advances to step S802, and the terminal device 102 waits until it receives a message 2 or a response to the message 1. When it is determined that the message 2 has been received (Yes in step S802), the terminal device 102 advances the processing to step S803 and determines whether or not a predetermined condition to transition to the connected state is satisfied. In one example, the terminal device 102 may determine that the predetermined condition to transition to the connected state is satisfied when the user data management unit 403 holds unsent user data of a predetermined amount or more, and may determine not to transition to the connected state when the amount of unsent user data is less than the predetermined amount. In another example, the terminal device 102 may determine whether or not the predetermined condition is satisfied on the basis of the battery level or the traffic pattern, as described above.

When it is determined that the predetermined condition to transition to the connected state is satisfied (Yes in step S803), the terminal device 102 advances the processing to step S804, sends a message 3 containing the user data and RRCResumeRequest to the base station device 101, and then advances the processing to step S806. When it is determined that the predetermined condition to transition to the connected state is not satisfied (No in step S803), the terminal device 102 advances the processing to step S805, sends a message 3 containing the user data but not RRCResumeRequest to the base station device 101, and then advances the processing to step S806.

In step S806, the terminal device 102 waits until it receives a message 4 or a response to the message 3. When it is determined that the message 4 has been received (Yes in step S806), the terminal device 102 advances the processing to step S807 and determines whether or not the received message 4 contains RRCResume. When it is determined that the received message 4 does not contain RRCResume (No in step S807), the terminal device 102 ends the processing of FIG. 8A. When it is determined that the received message 4 contains RRCResume (Yes in step S807), the terminal device 102 advances the processing to step S808, transitions to the connected state, and sends RRCResumeComplete to the base station device 101. Subsequently, the terminal device 102 advances the processing to step S809 to send and receive the user data, and then ends the processing of FIG. 8A.

An example of processing executed by the base station device 101 according to the present embodiment in the four-step RACH will now be described with reference to FIG. 8B. The processing of FIG. 8B is started by the processor 501 of the base station device 101 executing a predetermined program at, for example, the activation of the base station device 101.

In step S851, the base station device 101 waits for the message 1 from the terminal device 102. When it is determined that the message 1 has been received (Yes in step S851), the base station device 101 advances the processing to step S852 and sends a message 2 in response to the message 1. Subsequently, the base station device 101 advances the processing to step S853 and waits until it receives the message 3. When it is determined that the message 3 has been received (Yes in step S853), the base station device 101 advances the processing to step S854 and determines whether or not the received message 3 contains RRCResumeRequest.

When it is determined that the received message 3 does not contain RRCResumeRequest (No in step S854), the base station device 101 advances the processing to step S855 to send a message 4 not containing RRCResume on the basis of the decision that the terminal device 102 only has to send a small amount of user data and should not transition to the connected state, and then returns the processing to step S851. When it is determined that the received message 3 contains RRCResumeRequest (Yes in step S854), the base station device 101 advances the processing to step S856, determines that the terminal device 102 should transition to the connected state, and sends a message 4 containing RRCResume. Subsequently, the base station device 101 advances the processing to step S857 and stands by for RRCResumeComplete. When a message containing RRCResumeComplete is received (Yes in step S857), the base station device 101 advances the processing to step S858, communicates with the terminal device 102, and returns the processing to step S851 when the terminal device 102 returns to the inactive state, for example, by completing the communication.

Note that the base station device 101 may send a message 4 containing an acknowledgment (ACK) to the user data contained in the message 3 received in step S854, in step S855 or S856.

As described above, in the random access procedure, the terminal device according to the present embodiment sends messages containing predetermined information notifying the base station device that transition should be made from the inactive state to the connected state when the predetermined condition to transition from the inactive state to the connected state is satisfied. The predetermined condition may be based on the amount of user data to be sent, the battery level, or the traffic pattern. The predetermined information notifying the base station device that transition should be made to the connected state contains RRCResumeRequest. The base station device may send information pertaining to the predetermined condition to the terminal device.

When the base station device according to the present embodiment receives a first message containing user data from the terminal device in the inactive state, the base station device sends a message containing an instruction for the terminal device to transition to the connected state when the first message contains predetermined information. The transition instruction includes RRCResume.

In this way, the base station device can appropriately instruct the terminal device to transition to the connected state, and a reduction in the frequency utilization efficiency can be prevented.

Second Embodiment

In the first embodiment, the terminal device sends a message containing RRCResumeRequest in the random access procedure when the terminal device should transition to the connected state. The second embodiment describes an example of a wireless communication system including a terminal device that sends a message containing information pertaining to the amount of user data to be sent by the terminal device in the random access procedure when the terminal device should transition to the connected state. Note that the configuration and processing that are the same as those in the first embodiment are denoted by the same reference numerals, and redundant descriptions are omitted.

An example flow of the processing according to the present embodiment will now be described with reference to FIGS. 9A, 9B, 10A, and 10B. FIG. 9A illustrates example messages in the four-step RACH in a case where user data is transmitted and received between the base station device and the terminal device in the inactive state, and the base station device 101 is notified of the terminal device 102 not satisfying the condition to transition to the connected state. FIG. 9B illustrates example messages in the four-step RACH in the case where user data is sent and received between the base station device 101 and the terminal device 102 in the inactive state, and the base station device 101 is notified about information pertaining to the amount of user data the terminal device 102 should send when the terminal device 102 satisfies the condition to transition to the connected state.

When the terminal device 102 should transition to the connected state, the terminal device 102 sends a message 3 or message 913 containing a buffer status report, as illustrated in FIG. 9B. When the state should not transition to the connected state, a message 903 not containing the buffer status report is sent, as illustrated FIG. 9A.

When the received message 3 is the message 913 containing the buffer status report, the base station device 101 determines that the terminal device 102 should transition to the connected state and sends a message 914 containing RRCResume to the terminal device 102. When the received message 3 is the message 903 not containing the buffer status report, the base station device 101 determines that the terminal device 102 should not transition to the connected state and sends a message 904 not containing RRCResume to the terminal device 102.

Figure 10A:
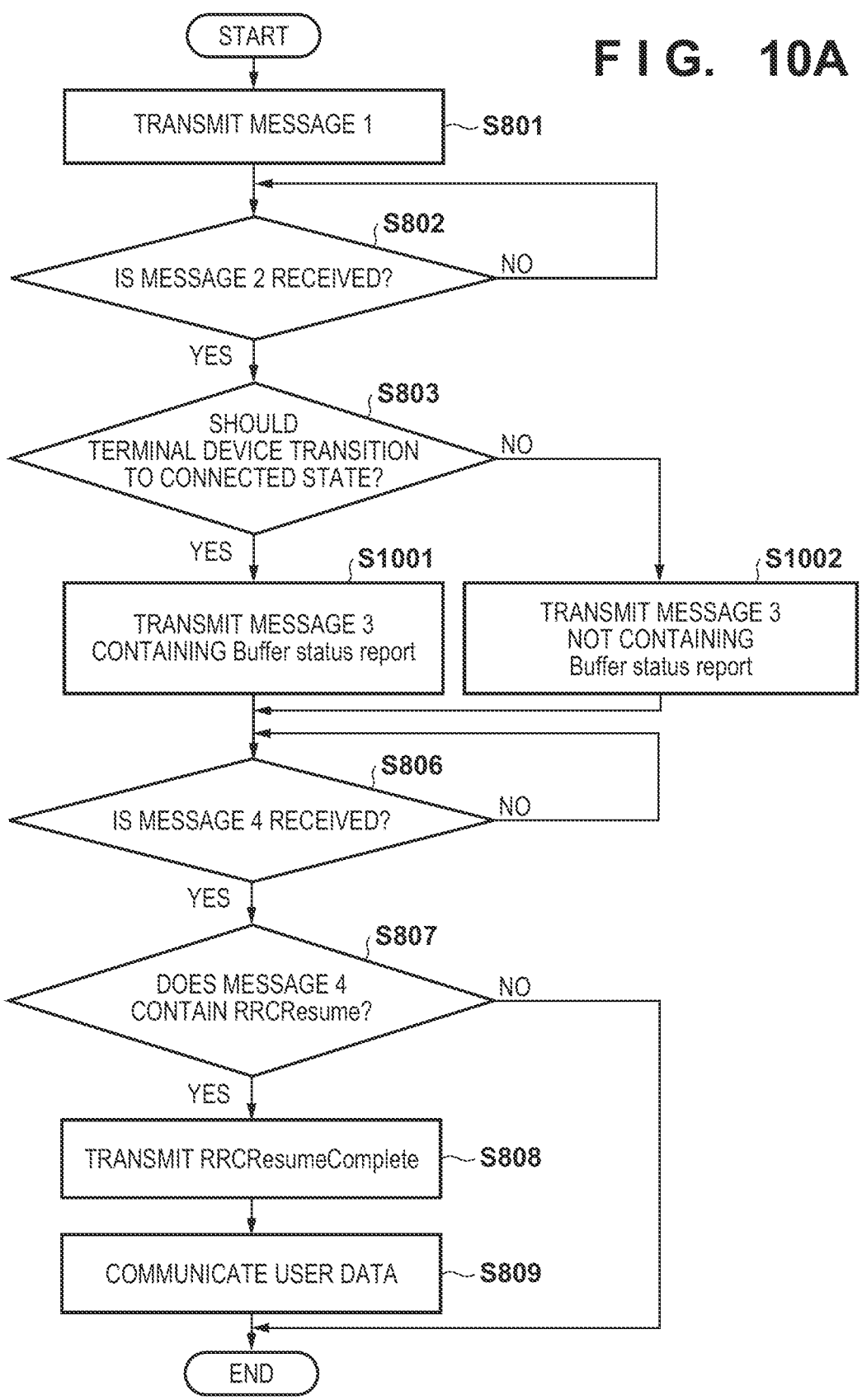
FIG. 10A is a diagram illustrating an example flow of processing executed in the wireless communication system according to the second embodiment.

An example of processing executed by the terminal device 102 according to the present embodiment in the four-step RACH will now be described with reference to FIG. 10A. The processing of FIG. 10A is started by the processor 301 executing a predetermined program when it is determined that there is data to be sent in the user data management unit 403 of the terminal device 102.

Since the processing of steps S801 to S803 is the same as that of the first embodiment, the description of this is omitted. When the terminal device 102 determines to transition to the connected state (Yes in step S803), the terminal device 102 advances the processing to step S1001, sends a message 3 containing user data and a buffer status report to the base station device 101, and then advances the processing to step S806. When the terminal device 102 determines not to transition to the connected state (No in step S803), the terminal device 102 advances the processing to step S1002, sends a message 3 containing user data but not a buffer status report to the base station device 101, and then advances the processing to step S806. Since the subsequent processing of the terminal device 102 is the same as that of the first embodiment, the description of this is omitted.

Note that, in one example, the terminal device 102 may send information indicating whether or not the amount of user data held by the user data management unit 403 is greater than a predetermined threshold value.

Figure 10B:
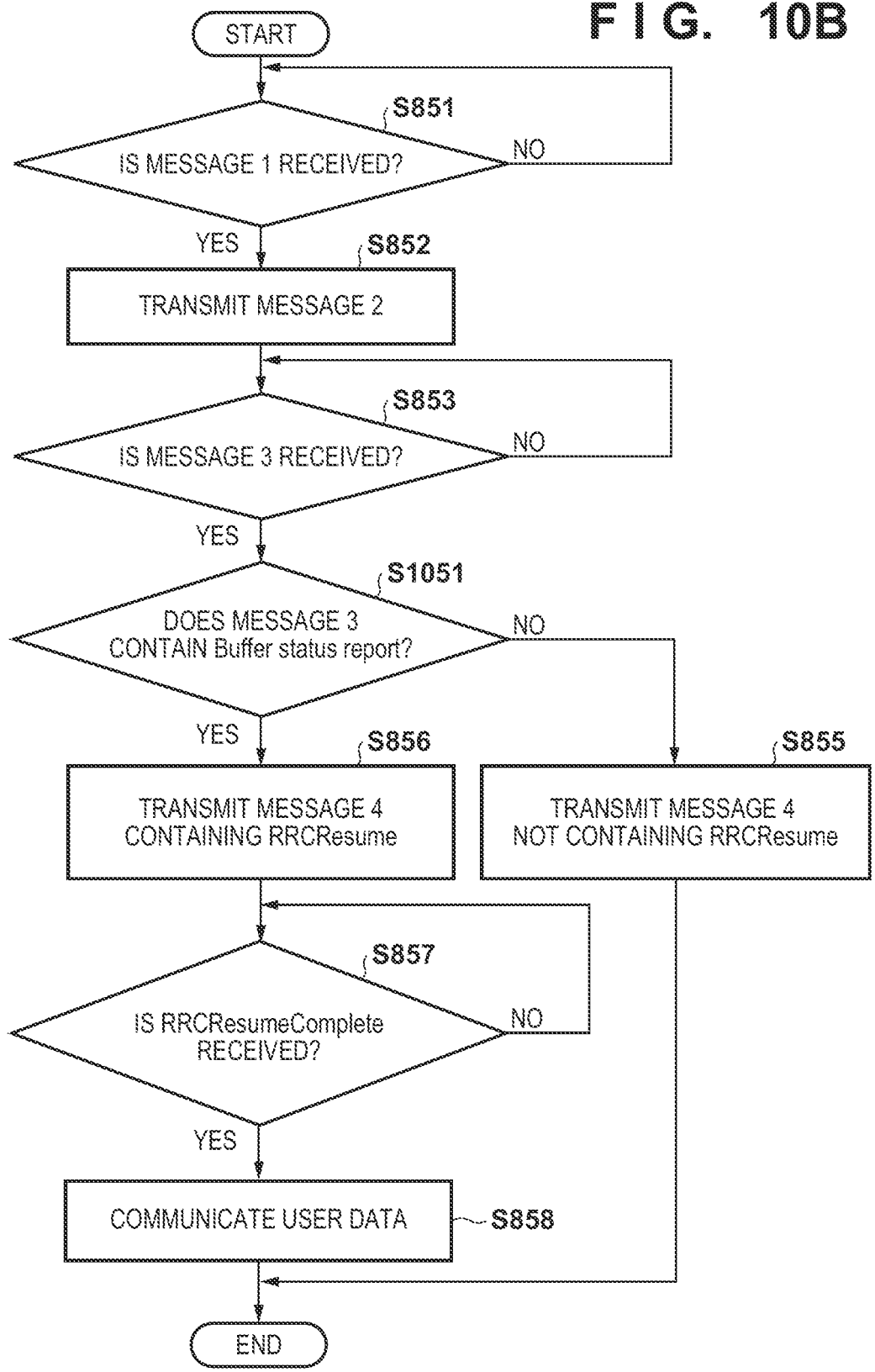
FIG. 10B is a diagram illustrating an example flow of processing executed in the wireless communication system according to the second embodiment.

An example of processing executed by the base station device 101 according to the present embodiment in the four-step RACH will now be described with reference to FIG. 10B. The processing of FIG. 10B is started by the processor 501 of the base station device 101 executing a predetermined program at, for example, the activation of the base station device 101.

Since the processing of steps S851 to S853 is the same as that of the first embodiment, description of this is omitted. When it is determined that the message 3 has been received (Yes in step S853), the base station device 101 advances the processing to step S1051 and determines whether or not the received message 3 contains a buffer status report.

When it is determined that the message 3 does not contain a buffer status report (No in step S1051), the base station device 101 advances the processing to step S855 and determines that the terminal device 102 does not satisfy the predetermined condition to transition to the connected state, sends a message 4 not containing RRCResume, and returns the processing to step S851. When it is determined that the received message 3 contains a buffer status report (Yes in step S1051), the base station device 101 advances the processing to step S856, determines that the terminal device 102 satisfies the predetermined condition to transition to the connected state, and sends a message 4 containing RRCResume. Since the subsequent processing of the base station device 101 is the same as that of the first embodiment, the description of this is omitted.

As described above, in the random access procedure, the terminal device according to the present embodiment sends messages containing a buffer status report as predetermined information notifying the base station device that transition should be made from the inactive state to the connected state when the predetermined condition to transition from the inactive state to the connected state is satisfied.

Third Embodiment

The third embodiment describes a base station device that further determines whether or not to instruct the terminal device to transition to the connected state on the basis of information indicating that the terminal device should transition to the connected state contained in the messages received from the terminal device. Note that the configuration and processing that are the same as those in the first and second embodiments are denoted by the same reference numerals, and redundant descriptions are omitted.

Figure 11A:
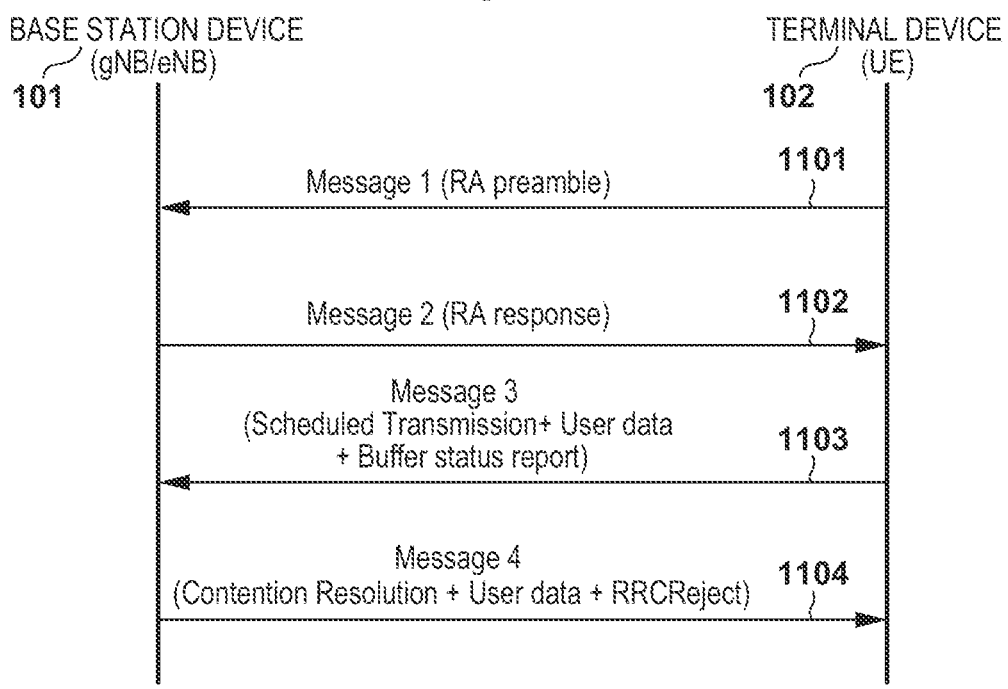
FIG. 11A is a diagram illustrating an example of messages transmitted and received in a wireless communication system according to a third embodiment.
Figure 11B:
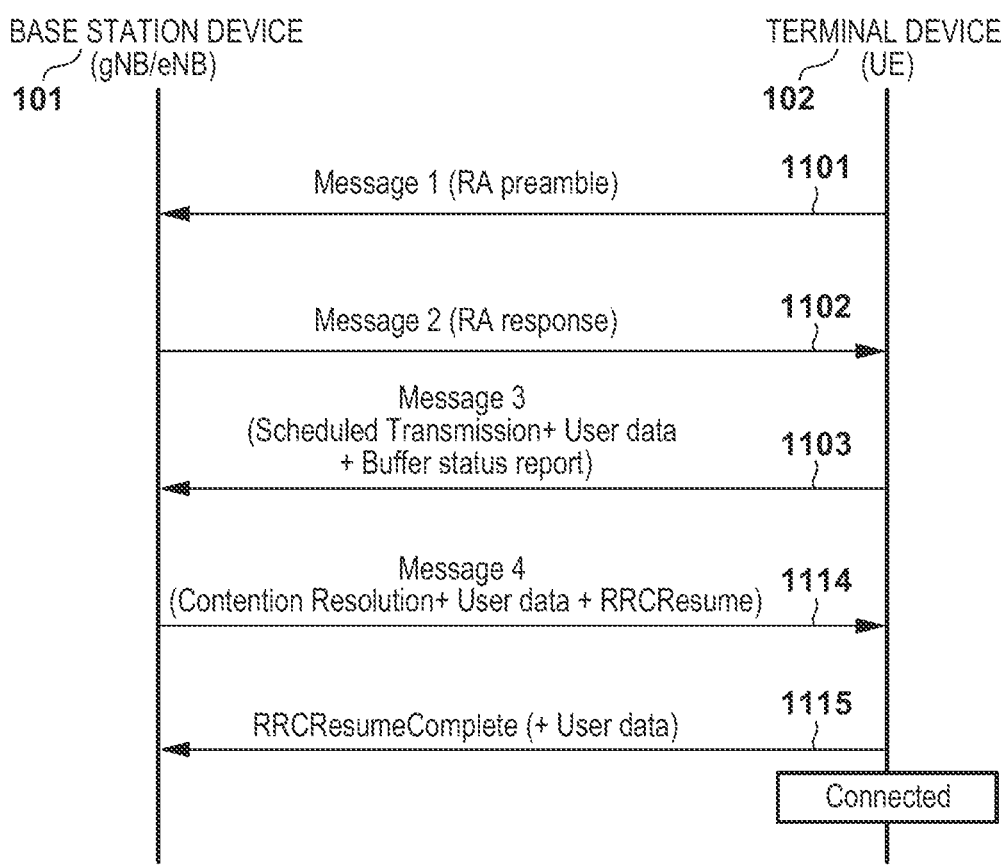
FIG. 11B is a diagram illustrating an example of messages transmitted and received in a wireless communication system according to the third embodiment.
Figure 12:
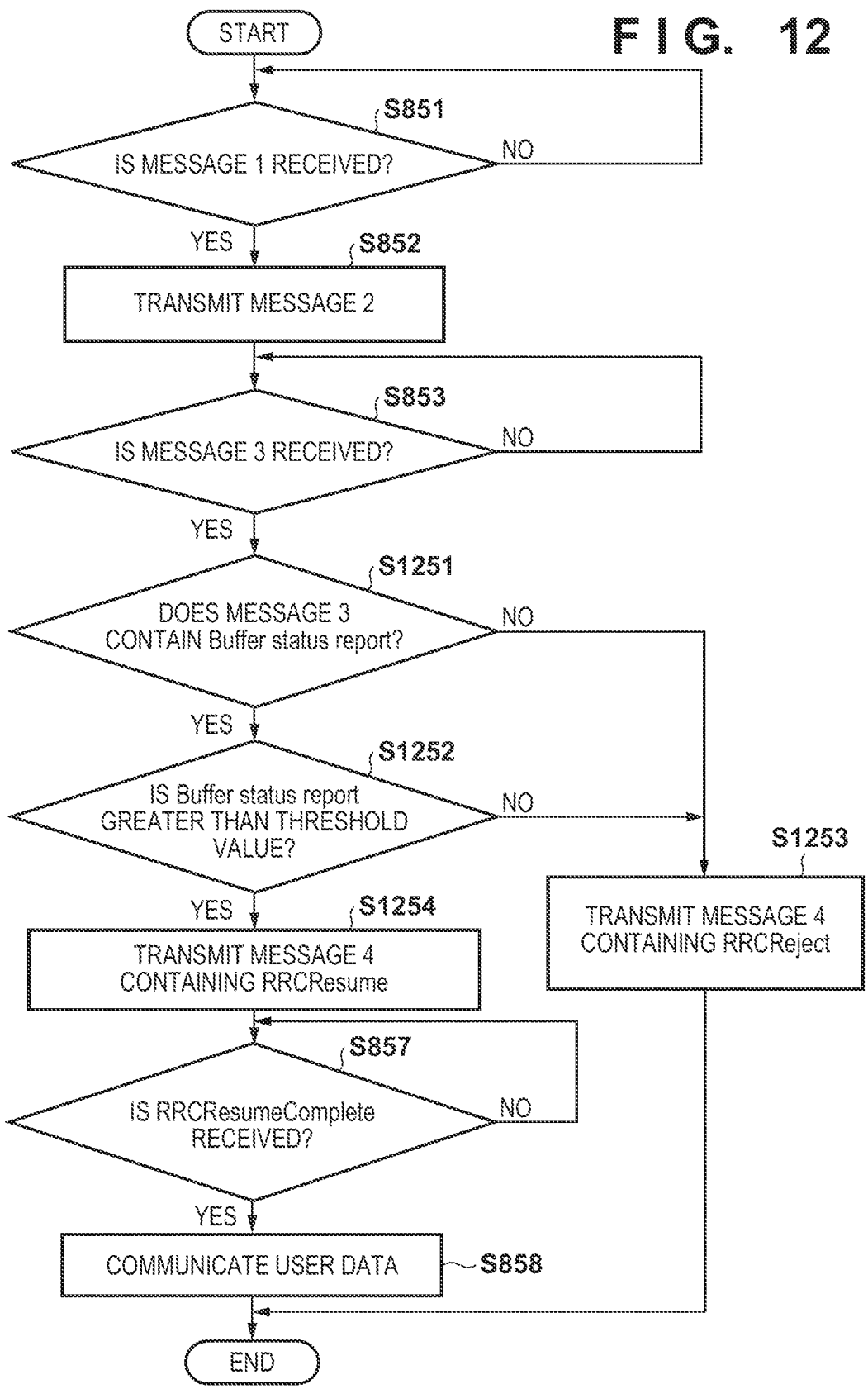
FIG. 12 is a diagram illustrating an example flow of processing executed in a base station device according to the third embodiment.

An example flow of the processing according to the present embodiment will now be described with reference to FIGS. 11A, 11B, and 12. FIG. 11A illustrates example messages in the four-step RACH in the case where, when the terminal device 102 satisfies the condition to transition to the connected state, the base station device 101 is notified of information pertaining to the amount of user data to be sent by the terminal device, but the base station device 101 does not instruct the transition to the connected state. FIG. 11B illustrates example messages in the four-step RACH in the case where, when the terminal device 102 satisfies the condition to transition to the connected state, the base station device 101 is notified of information pertaining to the amount of user data to be sent by the terminal device 102, and the base station device 101 instructs the transition to the connected state.

For messages 3 in FIGS. 11A and 11B, when the terminal device 102 should transition to the connected state, the terminal device 102 sends a message 1103 containing a buffer status report, and when the terminal device 102 should not transition to the connected state, the terminal device 102 sends a message 3 not including a buffer status report.

When the received message 3 (message 1103) contains a buffer status report, the base station device 101 determines whether or not to make the terminal device 102 transition to the connected state on the basis of the buffer status report. For example, when the base station device 101 receives an amount of data sent by the terminal device 102, but the received data amount is less than a predetermined amount, the base station device 101 may send a message 1104 containing RRCReject and may not make the terminal device 102 transition to the connected state. When the sent data amount is equal to or larger than the predetermined amount, a message 1114 containing RRCResume is sent, and the terminal device 102 is instructed to transition to the connected state.

Note that when the received message 3 is a message 3 not containing a buffer status report, the base station device 101 determines that the terminal device 102 should not transition to the connected state and sends a message 4 not containing RRCResume to the terminal device 102, as in the second embodiment.

An example of processing executed by the base station device 101 according to the present embodiment in the four-step RACH will now be described with reference to FIG. 12. The processing of FIG. 12 is started by the processor 501 of the base station device 101 executing a predetermined program at, for example, the activation of the base station device 101. Note that since the processing executed by the terminal device 102 according to the present embodiment in the four-step RACH is the same as that of the second embodiment, the description of this is omitted.

Since the processing of steps S851 to S853 is the same as that of the first embodiment, description of this is omitted. When it is determined the message 3 has been received (Yes in step S853), the base station device 101 advances the processing to step S1251 and determines whether or not the received message 3 contains a buffer status report.

When it is determined that the received message 3 does not contain a buffer status report (No in step S1251), the base station device 101 advances the processing to step S1253 to send a message 4 containing RRCReject on the basis of the decision that the terminal device 102 only has to send a small amount of user data and should not transition to the connected state, and then ends the processing. When it is determined that the received message 3 contains a buffer status report (Yes in step S1251), the base station device 101 advances the processing to step S1252 and determines whether or not the user data amount sent from the terminal device 102, which is included in the buffer status report, is greater than a threshold value. In one example, the threshold value is determined by the threshold determination unit 605. When the sent user data amount included in the buffer status report is greater than the threshold value (Yes in step S1252), the base station device 101 advances the processing to step S1254, and sends a message 4 containing RRCResume to the terminal device 102 to instruct the transition to the connected state. When the sent user data amount is equal to or smaller than the threshold value (No in step S1252), the base station device 101 advances the processing to step S1253 and sends a message 4 containing RRCReject to the terminal device 102 to reject the transition to the connected state. In one example, the base station device 101 may send a message containing RRCRelease with suspendConfig when it determines that the terminal device 102 does not satisfy the predetermined condition to transition to the connected state. Since the subsequent processing of the base station device 101 is the same as that of the first embodiment, the description of this is omitted.

As described above, when the base station device according to the present embodiment receives a first message containing user data from the terminal device in the inactive state, the base station device instructs the transition of the terminal device to the connected state on the basis of whether or not a buffer status report indicating that user data of an amount equal to or greater than a predetermined amount is included in the first message. In this way, the terminal device can be appropriately instructed to transition to the connected state, and a reduction in the frequency utilization efficiency can be prevented.

Fourth Embodiment

The fourth embodiment describes an example of processing in a two-step random access procedure by a wireless communication system that determines to instruct the terminal device to transition to the connected state and sends a message when a message from the terminal device contains information indicating the terminal device should be transitioned to the connected state. Note that the configuration and processing that are the same as those in any of the first and third embodiments are denoted by the same reference numerals, and redundant descriptions are omitted.

Figure 13A:
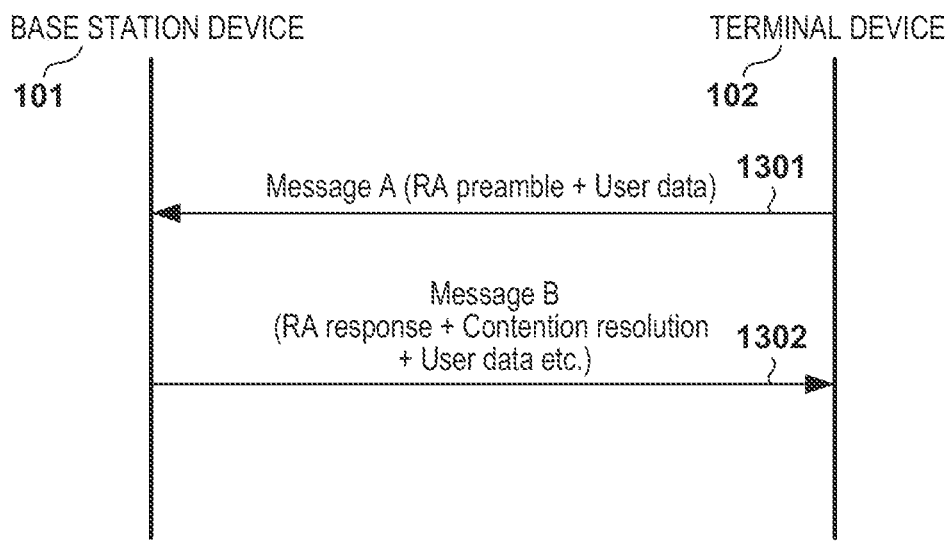
FIG. 13A is a diagram illustrating an example of messages transmitted and received in a wireless communication system according to a fourth embodiment.
Figure 13B:
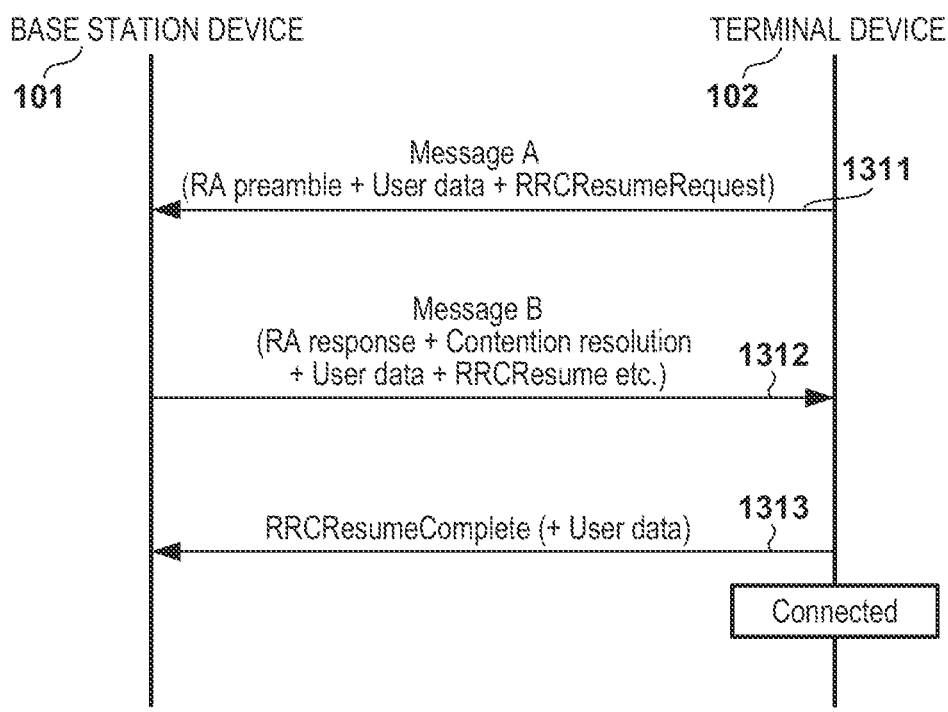
FIG. 13B is a diagram illustrating an example of messages transmitted and received in a wireless communication system according to the fourth embodiment.

An example flow of the processing according to the present embodiment will now be described with reference to FIGS. 13A, 13B, 14A, and 14B. FIG. 13A illustrates example messages in the two-step RACH in a case where user data is transmitted and received between the base station device 101 and the terminal device 102 in the inactive state, and the base station device 101 is notified of the terminal device 102 not satisfying the condition to transition to the connected state. FIG. 13B illustrates example messages in the two-step RACH in the case where user data is transmitted and received between the base station device 101 and the terminal device 102 in the inactive state, and the base station device 101 is notified of the terminal device 102 satisfying the condition to transition to the connected state.

In FIG. 13A, first, the terminal device 102 sends a message A to the base station device 101. The message A contains a random access preamble (RA preamble) and user data. The user data is sent via a PUSCH. When the terminal device 102 does not satisfy a predetermined condition to transition to the connected state, the terminal device 102 sends a message 1301 or message A not containing RRCResumeRequest, as illustrated in FIG. 13A. When the terminal device 102 satisfies the predetermined condition to transition to the connected state, the terminal device 102 sends a message 1311 or message A containing RRCResumeRequest, as illustrated in FIG. 13B.

As illustrated in FIG. 13A, when the base station device 101 receives the message 1301 not containing RRCResumeRequest, the base station device 101 sends a message B (message 1302) containing a random access response (RA response), Contention Resolution, and user data in response. In one example, the user data contained in the message 1302 includes an ACK to the user data in the message 1301. As illustrated in FIG. 13B, when the base station device 101 receives the message 1311 containing RRCResumeRequest, the base station device 101 sends a message 1312 or message B containing an RA response, Contention Resolution, user data, and RRCResume in response. When the terminal device 102 receives the message 1302, the terminal device 102 determines that it has not been instructed to transition to the connected state and ends the two-step RACH while maintaining the inactive state. The terminal device 102 that received the message 1312 sends a message 1313 containing RRCResumeComplete, transitions to the connected state, and sends and receives user data.

Figure 14A:
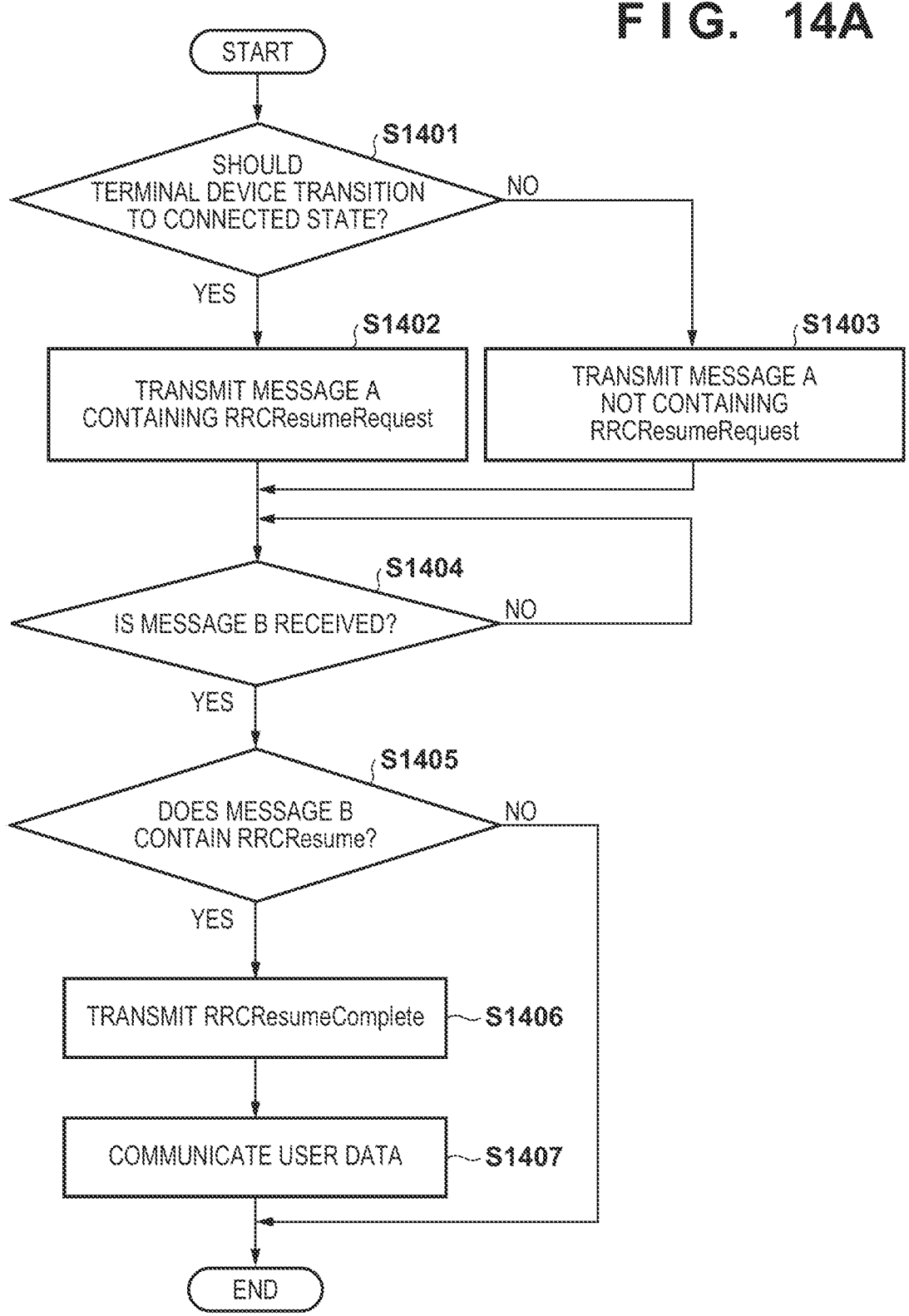
FIG. 14A is a diagram illustrating an example flow of processing executed in the wireless communication system according to the fourth embodiment.

An example of processing executed by the terminal device 102 according to the present embodiment in the two-step RACH will now be described with reference to FIG. 14A. The processing of FIG. 14A is started by the processor 301 executing a predetermined program when there is data to be sent to the user data management unit 403 of the terminal device 102.

In step S1401, the terminal device 102 determines whether or not to transition to the connected state. As described above, when the terminal device 102 determines that the user data management unit 403 has user data of amount equal to or larger than a predetermined amount, the terminal device 102 may determine that it should transition to the connected state.

When it is determined that the terminal device 102 should transition to the connected state (Yes in step S1401), the terminal device 102 advances the processing to step S1402 and sends a message A containing RRCResumeRequest. When it is determined that the terminal device 102 should not transition to the connected state (No in step S1401), the terminal device 102 advances the processing to step S1403 and sends a message A not containing RRCResumeRequest. The message A may contain user data whether or not it contains RRCResumeRequest.

The terminal device 102 then advances the processing to step S1404 and waits until it receives a message B from the base station device 101. When it is determined that the message B has been received (Yes in step S1404), the terminal device 102 advances the processing to step S1405 and determines whether or not the received message B contains RRCResume. When it is determined that the received message B does not contain RRCResume (No in step S1405), the terminal device 102 ends the processing of FIG. 14A. When it is determined that the received message B contains RRCResume (Yes in step S1045), the terminal device 102 advances the processing to step S1406. Since the processing of steps S1406 and S1407 is the same as that of step S808 and S809, respectively, of FIG. 8A, the description of these is omitted.

Figure 14B:
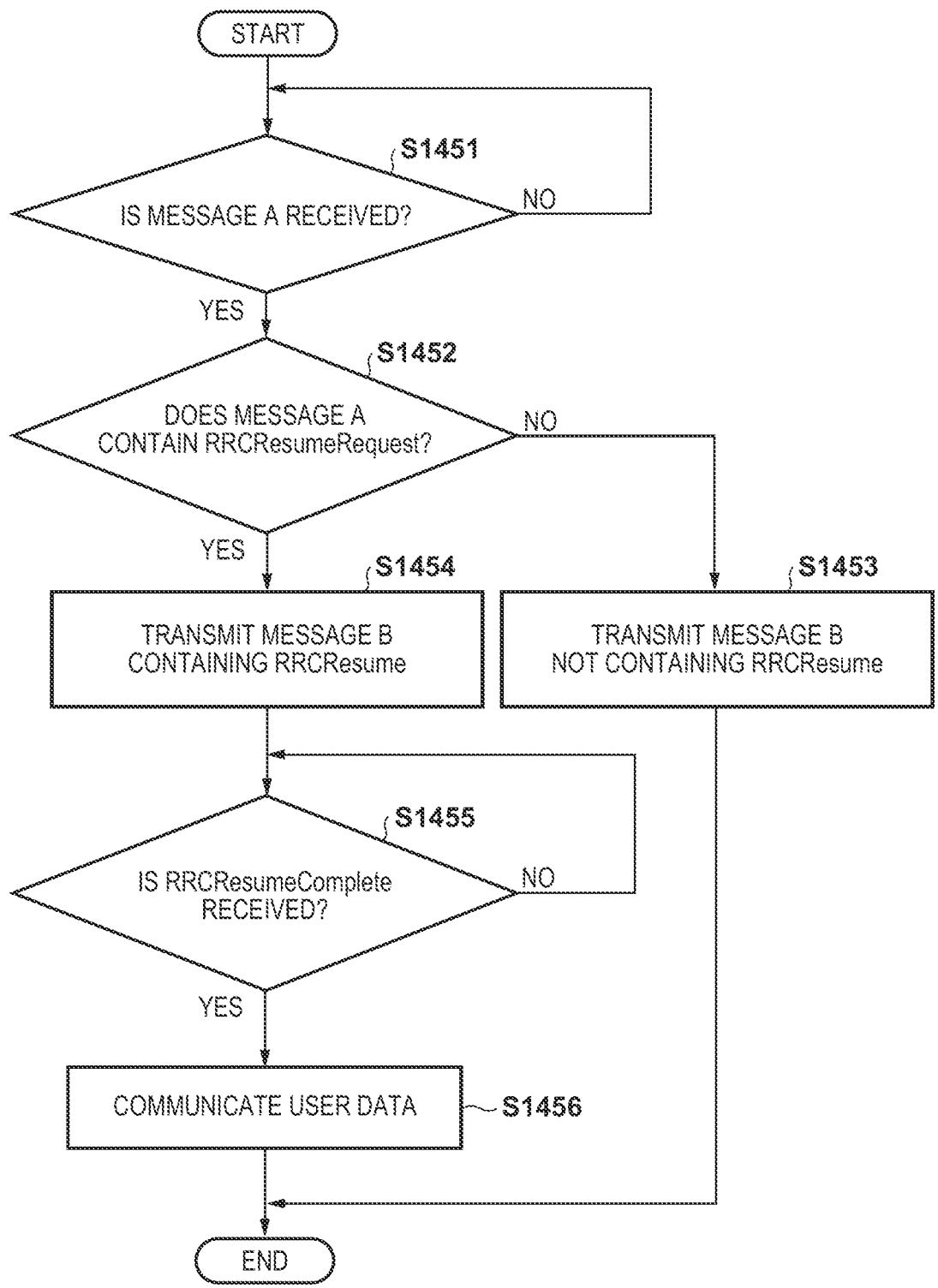
FIG. 14B is a diagram illustrating an example flow of processing executed in the wireless communication system according to the fourth embodiment.

An example of processing executed by the base station device 101 according to the present embodiment in the two-step RACH will now be described with reference to FIG. 14B. The processing of FIG. 14B is started by the processor 501 of the base station device 101 executing a predetermined program at, for example, the activation of the base station device 101.

In step S1451, the base station device 101 waits for a message A for the two-step RACH. When it is determined that the message A has been received (Yes in step S1451), the terminal device 102 advances the processing to step S1452 and determines whether or not the received message A contains RRCResumeRequest. When it is determined that the message A contains RRCResumeRequest, the base station device 101 advances the processing to step S1454 and sends a message B containing RRCResume to the terminal device 102. When it is determined that the message A does not contain RRCResumeRequest, the base station device 101 advances the processing to step S1453 and sends the message B not containing RRCResume. Note that the message B may contain user data, and, in one example, may contain an ACK to the user data in the received message A. Since the subsequent processing of steps S1455 and S1456 is the same as that of steps S857 and S858, respectively, of FIG. 8B, the description of this is omitted.

As described above, when the terminal device according to the present embodiment sends and receives user data to and from the base station device in the two-step random access procedure, the terminal device sends a message containing information pertaining to the amount of user data to be sent by the terminal device as information indicating that the terminal device should transition to the connected state. In this way, the base station device can determine whether or not to instruct the terminal device to transition to the connected state, perform appropriate message processing, and prevent the frequency utilization efficiency from decreasing.

Other Embodiments

The invention is not limited to the foregoing embodiments, and various variations/changes are possible within the spirit of the invention.

For example, in the message processing of the two-step RACH described in the fourth embodiment, when the terminal device determines that transition to the connected state is necessary, the terminal device may send a message A containing a buffer status report, as described in the third embodiment.

Note that the invention is not limited to the embodiments described above, and various modifications and variations are possible without departing from the spirit and scope of the invention. Accordingly, in order to make the scope of the invention public, the following claims are attached.

What is claimed is:
1. A terminal device comprising:
transmission unit configured to transmit a first message including user data to a base station device in a random access procedure in a mobile communication network; and
control unit configured to control the transmission unit to:
in a case where a predetermined condition to transition from an inactive state to a connected state is satisfied, transmit the first message that includes predetermined information for notifying the base station device that the terminal device needs to transition to the connected state; and in a case where the predetermined condition is not satisfied, transmit the first message that does not include the predetermined information,
wherein the predetermined condition is based on a traffic pattern of the user data that needs to be transmitted to the base station device.

2. The terminal device according to claim 1, further comprising:
first reception unit configured to receive a second message from the base station device as a response to the first message, wherein
the control unit controls the terminal device to:
transition to the connected state in a case where an instruction to transition to the connected state is included in the second message, and
maintain the inactive state in a case where the instruction is not included in the second message.

3. The terminal device according to claim 1, wherein the predetermined information includes at least one of RRCResumeRequest requesting an instruction to transition to the connected state and a buffer status report indicating the amount of user data that needs to be transmitted to the base station device.

4. The terminal device according to claim 1, wherein the predetermined condition is that the traffic pattern of the user data that needs to be transmitted to the base station device is shorter than a predetermined time interval.

5. The terminal device according to claim 1, further comprising:
second reception unit configured to receive information corresponding to the predetermined condition from the base station device.

6. The terminal device according to claim 1, wherein
the random access procedure is a four-step random access procedure, and
the first message is a message transmitted after a random access response.

7. The terminal device according to claim 1, wherein
the random access procedure is a two-step random access procedure, and
the first message further includes a random access preamble.

8. A base station device of a mobile communication network, comprising:
reception unit configured to receive a first message including user data from a terminal device that is in an inactive state, in a random access procedure;
first transmission unit configured to transmit a second message as a response to the first message;
control unit configured to control the first transmission unit to:
in a case where the first message includes predetermined information, transmit the second message that includes an instruction to transition to a connected state to the terminal device; and
in a case where the first message does not include the predetermined information, transmit the second message that does not include the instruction; and
second transmission unit configured to transmit a predetermined condition for transmitting the first message that includes the predetermined information to the terminal device,
wherein the predetermined condition is based on a traffic pattern of the user data that needs to be transmitted to the base station device.

9. The base station device according to claim 8, wherein the predetermined information includes at least one of RRCResumeRequest requesting transition to the connected state and a buffer status report indicating the amount of user data that needs to be transmitted to the base station device, the amount of user data being equal to or greater than a predetermined amount.

10. The base station device according to claim 8, wherein the second transmission unit transmits information corresponding to the predetermined amount to the terminal device by a broadcast signal or an RRCRelease signal.

11. A control method executed by a terminal device of a mobile communication network, comprising:
a transmission step of transmitting a first message including user data to a base station device in a random access procedure in a mobile communication network, wherein
in the transmission step:
in a case where a predetermined condition for transitioning from an inactive state to a connected state is satisfied, the first message that includes predetermined information for notifying the base station device that the terminal device needs to transition to the connected state is transmitted; and
in a case where the predetermined condition is not satisfied, the first message that does not include the predetermined information is transmitted,
wherein the predetermined condition is based on a traffic pattern of the user data that needs to be transmitted to the base station device.

12. A non-transitory computer-readable storage medium storing a program for causing a computer provided in a terminal device of a mobile communication network to transmit a first message including user data to a base station device in a random access procedure, the program controlling the terminal device to:
in a case where a predetermined condition for transitioning from an inactive state to a connected state is satisfied, transmit the first message that includes predetermined information for notifying the base station device that the terminal device needs to transition to the connected state; and
in a case where the predetermined condition is not satisfied, transmit the first message that does not include the predetermined information,
wherein the predetermined condition is based on a traffic pattern of the user data that needs to be transmitted to the base station device.

13. A control method executed by a base station device of a mobile communication network, comprising:
a reception step of receiving a first message including user data from a terminal device that is in an inactive state, in a random access procedure; and
a transmission step of transmitting a second message as a response to the first message,
wherein
in the transmission step,
in a case where the first message satisfies a predetermined condition, the second message that includes an instruction to transition to a connected state is transmitted to the terminal device; and
in a case where the first message does not satisfy the predetermined condition, the second message that does not include the instruction is transmitted to the terminal device,
wherein the predetermined condition is based on a traffic pattern of the user data that needs to be transmitted to the base station device.

14. A non-transitory computer-readable storage medium storing a program for causing a computer provided in a base station device of a mobile communication network to control a terminal device to:
- receive a first message including user data from the terminal device that is in an inactive state, in a random access procedure; and
- transmit a second message as a response to the first message, wherein
- in a case where the first message satisfies a predetermined condition, the second message that includes an instruction to transition to a connected state is transmitted to the terminal device; and
- in a case where the first message does not satisfy the predetermined condition, the second message that does not include the instruction is transmitted,
- wherein the predetermined condition is based on a traffic pattern of the user data that needs to be transmitted to the base station device.

\* \* \* \* \*